(12) United States Patent
Peng et al.

(10) Patent No.: US 12,431,825 B2
(45) Date of Patent: Sep. 30, 2025

(54) SINGLE-WIRE CONTROL DEVICE FOR BRUSHLESS DIRECT CURRENT MOTOR

(71) Applicant: Chip-GaN Power Semiconductor Corporation, Hsinchu (TW)

(72) Inventors: Sheng-Yu Peng, Hsinchu (TW); Sheng-Ming Hu, Hsinchu (TW)

(73) Assignee: Chip-GaN Power Semiconductor Corporation, Hsinchu (TW)

( * ) Notice: Subject to any disclaimer, the term of this patent is extended or adjusted under 35 U.S.C. 154(b) by 146 days.

(21) Appl. No.: 18/512,119

(22) Filed: Nov. 17, 2023

(65) Prior Publication Data
US 2025/0167700 A1 May 22, 2025

(51) Int. Cl.
*H02P 6/14* (2016.01)
*H02P 7/29* (2016.01)

(52) U.S. Cl.
CPC ..................... *H02P 7/29* (2013.01)

(58) Field of Classification Search
CPC .... H02P 6/20; H02P 6/085; H02P 6/28; H02P 6/10; H02P 6/14; H02P 7/29; A63H 29/22
USPC .................................................. 318/400.179
See application file for complete search history.

(56) References Cited

U.S. PATENT DOCUMENTS

| | | | | |
|---|---|---|---|---|
| 11,791,759 B2* | 10/2023 | Combes | .............. | H02M 7/5395 318/811 |
| 2013/0234634 A1* | 9/2013 | Hofer | ..................... | A63H 30/04 318/400.09 |
| 2013/0264979 A1* | 10/2013 | Marchitto | ................. | H02P 6/08 318/400.27 |
| 2013/0342146 A1* | 12/2013 | Lawrence | ............... | H02P 6/183 318/400.33 |
| 2015/0188462 A1* | 7/2015 | Soh | .......................... | H02P 6/20 318/400.13 |
| 2015/0188463 A1* | 7/2015 | Soh | ......................... | H02P 6/085 318/400.13 |
| 2017/0222539 A1* | 8/2017 | Nishimoto | .............. | H02M 1/08 |

* cited by examiner

*Primary Examiner* — Gabriel Agared

(57) ABSTRACT

A single-wire control device for brushless DC (BLDC) motor is disclosed, applicable to the usage between a controller and a pre-drive stage of the BLDC motor, including an encoding modulation unit, a transmission wire, and a demodulation decoding unit; wherein, the encoding modulation unit is connected to the controller to receive a plurality of control signals from the controller, and encodes and modulates the control signals to generate a modulated signal; the transmission wire is connected to the encoding modulation unit for transmitting the modulated signal to the demodulation decoding unit; the demodulation decoding unit is connected to the transmission wire for receiving, demodulate and decoding the modulated signal to generate the original control signal, which is then passed to the pre-driver stage.

12 Claims, 17 Drawing Sheets

| AH (Input) | S1 (Output) |
|---|---|
| 0 | OFF |
| 1 | ON |

| AL (Input) | S2 (Output) |
|---|---|
| 0 | OFF |
| 1 | ON |

| BH (Input) | S3 (Output) |
|---|---|
| 0 | OFF |
| 1 | ON |

| BL (Input) | S4 (Output) |
|---|---|
| 0 | OFF |
| 1 | ON |

FIG. 5C

| AH (Input) | S1 (Output) |
|---|---|
| 0 | OFF |
| 1 | ON |

| AL (Input) | S2 (Output) |
|---|---|
| 0 | OFF |
| 1 | ON |

| BH (Input) | S3 (Output) |
|---|---|
| 0 | OFF |
| 1 | ON |

| BL (Input) | S4 (Output) |
|---|---|
| 0 | OFF |
| 1 | ON |

| CH (Input) | S5 (Output) |
|---|---|
| 0 | OFF |
| 1 | ON |

| CL (Input) | S6 (Output) |
|---|---|
| 0 | OFF |
| 1 | ON |

FIG. 10C

SINGLE-WIRE CONTROL DEVICE FOR BRUSHLESS DIRECT CURRENT MOTOR

BACKGROUND OF THE INVENTION

1. Field of the Invention

The present invention relates generally to a single-wire control device for brushless direct current motor.

2. The Prior Arts

Brushless DC Motor (BLDC) is a motor without brushes and commutators. The stator current is adjusted according to the position of the rotor permanent magnet to generate a torque. It is called a "brushless DC motor" because it can replace a brushed DC motor in many applications.

The BLDC motor uses a controller to detect changes in the position and speed of the rotor, and promptly sends a commutation control signal to the motor to cause the motor to start rotating. In other words, the direction of current passing through the coil set is controlled by switching the DC power switch to obtain torque to rotate the rotor. Traditionally, those driven by square waves are called BLDC; those driven by sine waves are called PMSM. Common BLDCs include single-phase brushless DC motor (SBLDC) and three-phase brushless DC motor.

Generally, four wirings are needed between the drive controller, pre-drive stage and power stage of SBLDC to transmit control signals. FIG. 1 shows a schematic view of the control signals between the conventional SBLDC controller and the pre-drive stage. As shown in FIG. 1, the left side shows the controller 101 outputting four control signals, namely AH, AL, BH, and BL to the pre-drive stage 102, and then the pre-drive stage 102 converts the received control signals AH, AL, BH, BL into S1, S2, S3, S4 for outputting to control the four transistors of the power stage 103; wherein M is the motor, PH1 and PH2 are the states of motor M, VA and VB represent the potentials of points A and B respectively.

Similarly, six wirings are required between the drive controller, pre-drive stage and power stage of the three-phase BLDC to transmit control signals. FIG. 2 shows a schematic view of the control signals between the conventional three-phase BLDC controller and the pre-driver. As shown in FIG. 1, the left side shows the controller 201 outputting six control signals, namely AH, AL, BH, BL, CH, CL to the pre-driver stage 202, and then the pre-driver stage 202 converts the received control signals AH, AL, BH, BL, CH, CL into S1, S2, S3, S4, S5, S6 for outputting to control the six transistors in the power stage 203; wherein, M is the motor, with pins connected to three points A, B, and C respectively.

However, the number of pins used in the conventional technology is large and occupies a large area of the circuit board. Therefore, reducing the number of pins will help further miniaturization of the BLDC.

SUMMARY OF THE INVENTION

A primary objective of the present invention is to provide a single-wire control device for a brushless DC motor, suitable for use between a controller and a pre-drive stage of a brushless DC motor, so that a control signal can be transmitted between the controller and the pre-drive stage via a single transmission wire.

In order to achieve the aforementioned objective, the present invention provides a single-wire control device for a brushless DC motor, suitable for use between a controller and a pre-drive stage of the brushless DC motor, and includes an encoding modulation unit, a transmission wire, and a demodulation decoding unit; wherein the encoding modulation unit is connected to the controller for receiving control signals from the controller and performing encoding and modulation on the control signal to generate a modulated signal; the transmission wire is connected to the encoding modulation unit to transmit the modulated signal to the demodulation decoding unit; the demodulation decoding unit is connected to the transmission wire, and is used to demodulate and decode the received modulated signal to generate an original control signal, and then transmit the control signal to the pre-driver stage.

In a preferred embodiment, the brushless DC motor is a single-phase brushless DC motor, and there are four control signals, designated as AH, AL, BH, and BL, respectively.

In a preferred embodiment, when the control signal [AH, AL, BH, BL]=[0, 0, 0, 0], the single-phase brushless DC motor is in a PH_OFF state, and the modulated signal output by the encoding modulation unit is 0; when the control signal [AH, AL, BH, BL]=[1, 0, 0, X], the single-phase brushless DC motor is in a PH1 state, the modulated signal output by the encoding modulation unit is MBL; when the control signal [AH, AL, BH, BL]=[0, X, 1, 0], the single-phase brushless DC motor is in a PH2 state, the modulated signal output by the encoding modulation unit is MAL; wherein, and MBL are the modulated AL and BL signals, respectively.

In a preferred embodiment, the modulation function for the AL is MAL=0.3×AL+0.7×VDD, and the modulation function for the BL is MBL=0.3×BL+0.2×VDD, wherein VDD is a voltage source.

In a preferred embodiment, the demodulation decoding unit further includes a comparison module and a combinational logic circuit; the comparison module processes the modulated signal through a comparison procedure to generate PH1HL, PH2, PH2HL, and PHOFF signals and the combinational logic circuit then maps the four signals PH1HL, PH2, PH2HL, and PHOFF into four original control signals AL, AH, BL, and BH.

In a preferred embodiment, the operation of the comparison procedure is as follows:
  when the modulated signal>VDD×85%, PH2HL=1; otherwise PH2HL=0;
  when the modulated signal>VDD×60%, PH2=1; otherwise PH2=0;
  when the modulated signal<VDD×15%, PHOFF=1; otherwise PHOFF=0; and
  when the modulated signal>VDD×35%, PH1HL=1; otherwise PH1HL=0.

In a preferred embodiment, the combinational logic circuit operates as follows:
  AL=PH2HL∧BH;
  BH=PH2∧¬(PHOFF);
  AH=¬(PH2∨PHOFF);
  BL=AH∧PH1HL;
  wherein, ∧, ∨, and ¬ are logical operation symbols AND, OR, and NOT respectively.

In a preferred embodiment, the brushless DC motor is a three-phase brushless DC motor, and there are six control signals, designated as AH, AL, BH, BL, CH, and CL.

In a preferred embodiment, when the control signals [AH, AL, BH, BL, CH, CL]=[1, 0, 0, 0, 0, X], the three-phase brushless DC The motor is in a PH1 state, the modulated signal output by the encoding modulation unit is MCL, and a basic voltage is 0V; when the control signals [AH, AL, BH, BL, CH, CL]=[1, 0, 0, X, 0, 0], the three-phase brushless DC motor is in a PH2 state, the modulated signal output by the encoding modulation unit is MBL, and the basic voltage is VDD×0.8; when the control signals [AH, AL, BH, BL, CH, CL]=[0, 0, 0, X, 1, 0], the three-phase brushless DC motor is in a PH3 state, and the modulated signal output by the encoding modulation unit is MBL, and the basic voltage is VDD×0.5; when the control signals [AH, AL, BH, BL, CH, CL]=[0, X, 0, 0, 1, 0], the three-phase brushless DC motor is in a PH4 state, the modulated signal output by the encoding modulation unit is MAL, and the basic voltage is VDD×0.8; when the control signals [AH, AL, BH, BL, CH, CL]=[0, X, 1, 0, 0, 0], the three-phase brushless DC motor is in a PH5 state, the modulated signal output by the encoding modulation unit is MAL, and the basic voltage is VDD×0.5; when the control signals [AH, AL, BH, BL, CH, CL]=[0, 0, 1, 0, 0, X], the three-phase brushless DC motor is in a PH6 state, the modulated signal output by the encoding modulation unit is MCL, and the basic voltage is VDD×0.8; wherein X means does not matter whether the potential of the signal is 1 or 0, PH1, PH2, PH3, PH4, PH5, and Ph6 are six different states for the three-phase brushless DC motor, and basic voltage is a voltage value added to the modulated signal before finishing modulation, wherein VDD is a voltage source.

In a preferred embodiment, the modulation functions for AL, BL, and CL are respectively MAL=0.2×AL+basic voltage, MBL=0.2×BL+basic voltage, and MCL=0.2×CL+basic voltage.

In a preferred embodiment, the demodulation decoding unit further includes a comparison module and a combinational logic circuit; the comparison module processes the modulated signal through a comparison procedure to generate five signals, including PH1, PH1HL, PH246, PH246HL, PH35, and then the PH246 signal goes through an edge detector and the PH1 signal goes through a state counter to output five signals, including PH2, PH3, PH4, PH5, PH6 signals; and, the combinational logic circuit maps ten signals, including PH1, PH1HL, PH246, PH246HL, PH35, PH2, PH3, PH4, PH5, and PH6 into six original control signals, including AL, AH, BL, BH, CH, and CL.

In a preferred embodiment, the operation of the comparison procedure is as follows:
  when the modulated signal>VDD×95%, PH246HL=1; otherwise PH246HL=0;
  when the modulated signal>VDD×60%, PH35HL=1; otherwise PH35HL=0;
  when the modulated signal>VDD×10%, PH1HL=1; otherwise PH1HL=0;
  when the modulated signal>VDD×75%, PH246=1; otherwise PH246=0; and
  when the modulated signal<VDD×30%, PH1=1; otherwise PH1=0.

In a preferred embodiment, the combinational logic circuit operates as follows:
  AH=PH1∨PH2;
  BH=PH5∨PH6;
  CH=PH3∨PH4;
  AL=(PH246HL∧PH4)∨(PH35HL∧PH5);
  BL=(PH246HL∧PH2)∨(PH35HL∧PH3);
  CL=(PH246HL∧PH6)∨(PH1HL∧PH1);
  wherein ∧ and ∨ are the logical operation symbols AND and OR, respectively.

In a preferred embodiment, the encoding modulation unit is integrated in the controller of the brushless DC motor; and the demodulation decoding unit is integrated in the pre-drive stage of the brushless DC motor; or, the demodulation decoding unit, pre-driver stage and power stage integrated together.

The effect of the present invention is that the single-wire control device for brushless DC motor of the present invention can eliminate the original requirement of 4-6 transmission wires to transmit the control signal between the controller and the pre-drive stage. Through the modulation design, the present invention effectively modulates the signals so that the signals can be transmitted by a single transmission wire; furthermore, the single-wire control device for brushless DC motor can be further integrated into the controller and pre-driver stage to reduce the occupied circuit board area.

BRIEF DESCRIPTION OF THE DRAWINGS

The present invention will be apparent to those skilled in the art by reading the following detailed description of a preferred embodiment thereof, with reference to the attached drawings, in which:

FIG. 5C shows a truth table between the control signals AL, AL, BH, BL and the drive signals S1, S2, S3, S4 of the power stage of the single-phase brushless DC motor.

FIG. 10C shows a truth table between the control signals AL, AL, BH, BL, CH, CL and the drive signals S1, S2, S3, S4, S5 and S6 of the power stage of the single-phase brushless DC motor.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 3:
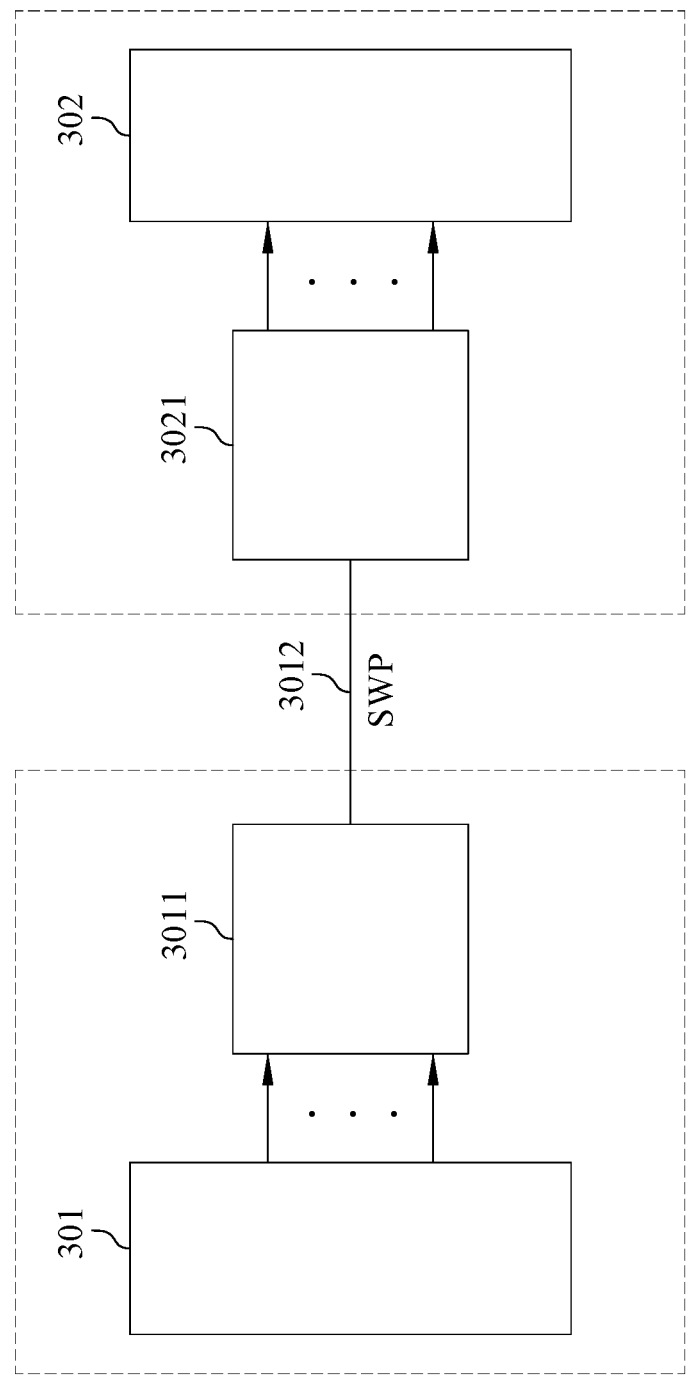
FIG. 3 shows a structural block diagram of the single-wire control device for brushless DC motor of the present invention.

FIG. 3 shows a structural block diagram of the single-wire control device for brushless DC motor of the present invention. As shown in FIG. 3, a single-wire control device for brushless DC motor of the present invention is suitable for use between a controller 301 and a pre-drive stage 302 of the brushless DC motor, and includes an encoding modulation unit 3011, a transmission wire 3012, and a demodulation decoding unit 3021; wherein the encoding modulation unit 3011 is connected to the controller 301 for receiving control signals from the controller 301, and then encodes and modulates the control signals to generate a modulated signal; the transmission wire (marked as SWP in the FIG. 3012 is connected to the encoding modulation unit 3011 to transmit the modulated signal to the demodulation decoding unit 3021; the demodulation decoding unit 3021 is connected to the transmission wire 3012, and is used to demodulate and decode the received modulated signal to generate an original control signal, and then transmit the control signal to the pre-driver stage 302.

Figure 1:
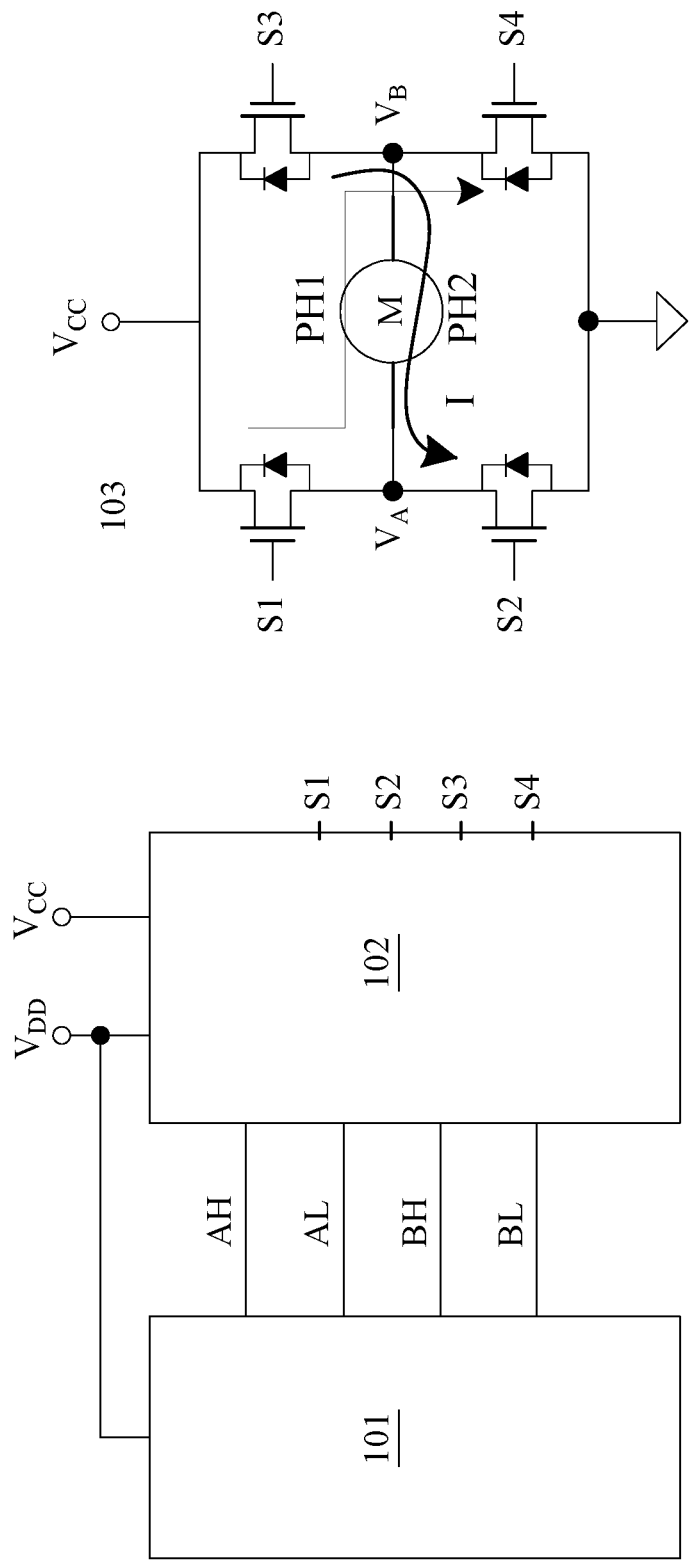
FIG. 1 shows a schematic view of control signals between a conventional SBLDC controller and a pre-driver stage.

It is worth noting that although in FIG. 3, the encoding modulation unit 3011 is independent of the controller 301, in a preferred embodiment, the encoding modulation unit 3011 can be integrated into the controller 301 of the brushless DC motor, as shown in the dotted box in the FIG. 3. Similarly, the demodulation decoding unit 3021 can also be integrated into the pre-drive stage 302 of the brushless DC motor, or the demodulation decoding unit 3021, the pre-drive stage 302, and the aforementioned power stage 103 in FIG. 1 can be integrated together. As such, the area occupied on the circuit board can be further reduced, so reducing the number of pins used will help further miniaturization of the BLDC.

Figure 4:
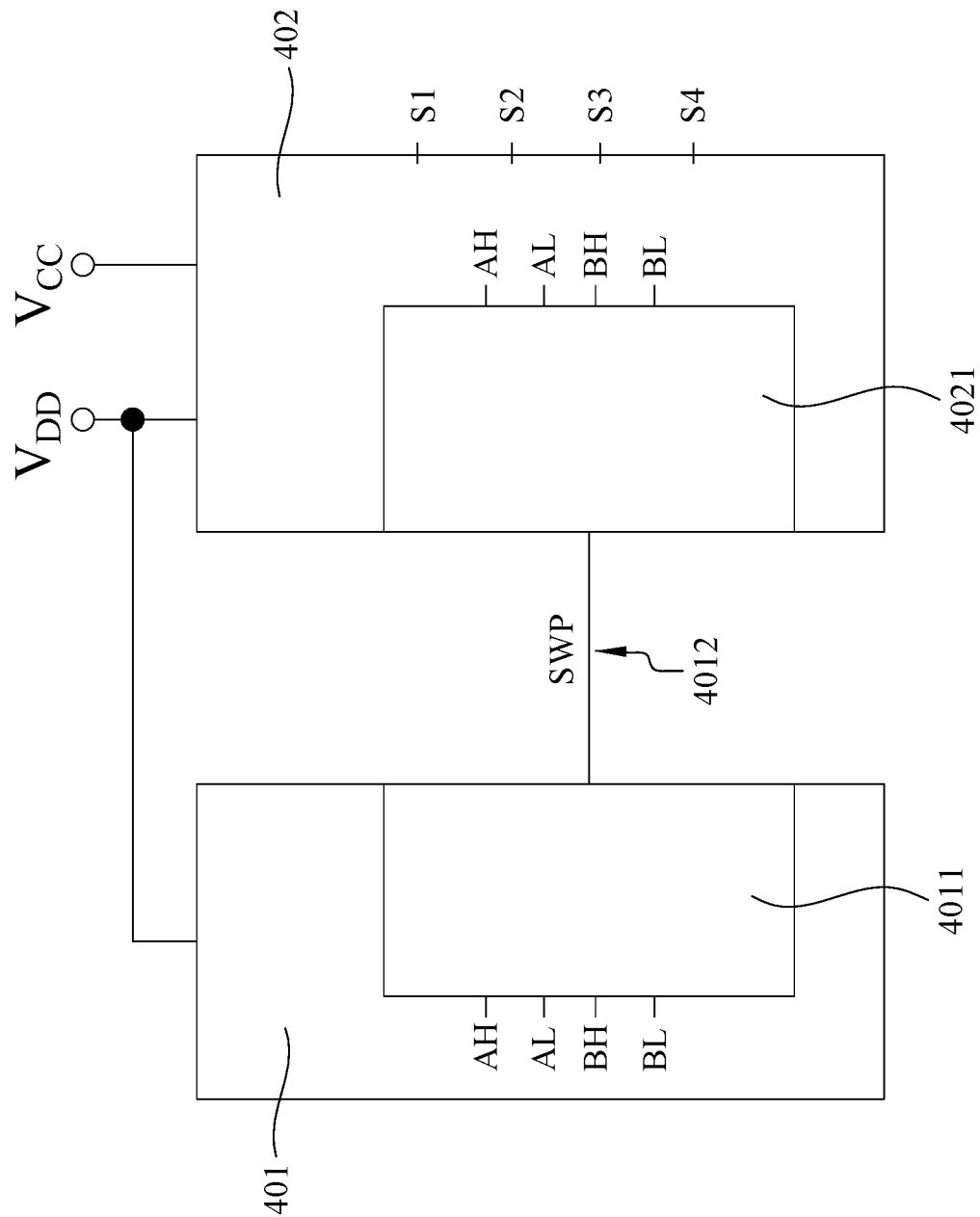
FIG. 4 is a schematic structural view when the single-wire control device for brushless DC motor of the present invention is applied to a single-phase brushless DC motor.

FIG. 4 shows a schematic structural view when the single-wire control device for brushless DC motor of the present invention is applied to a single-phase brushless DC motor; as shown in FIG. 4, there are four control signals, namely AH, AL, BH, BL. Furthermore, the encoding modulation unit 4011 is integrated in the controller 401 of the brushless DC motor, and the demodulation decoding unit 4021 is also integrated in the pre-drive stage 402 of the brushless DC motor, and the modulated control signal is transmitted through a transmission wire 4012.

Figure 5A:
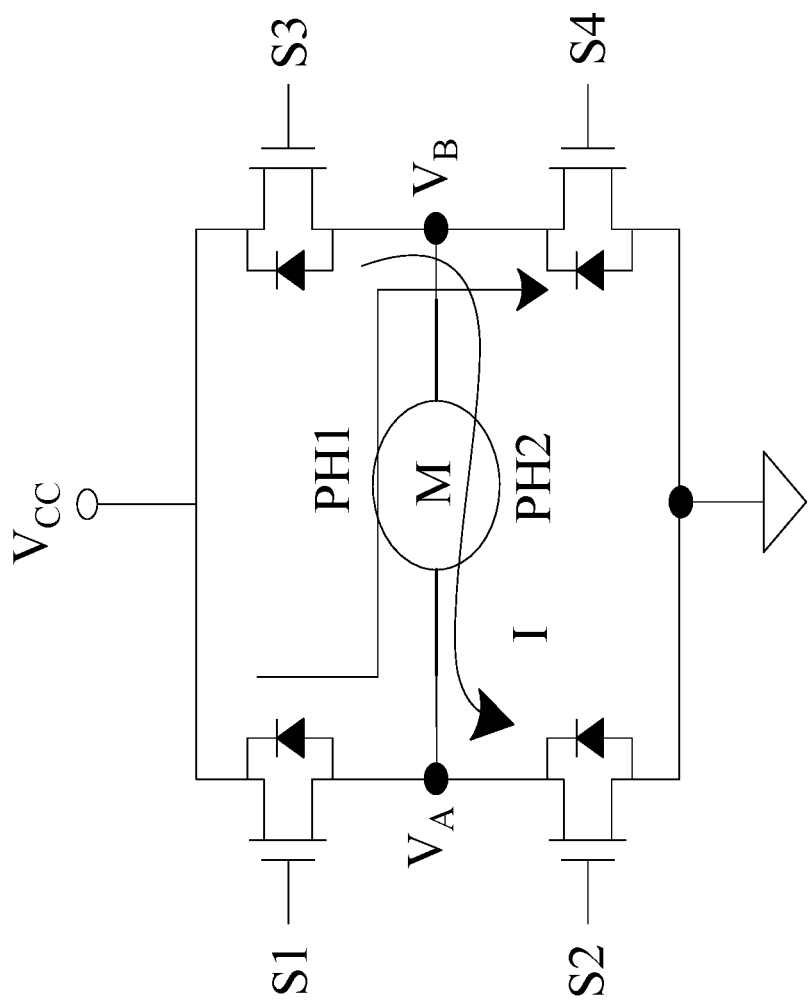
FIG. 5A shows a schematic view of the circuit structure of the power stage of a single-phase brushless DC motor.
Figure 5B:
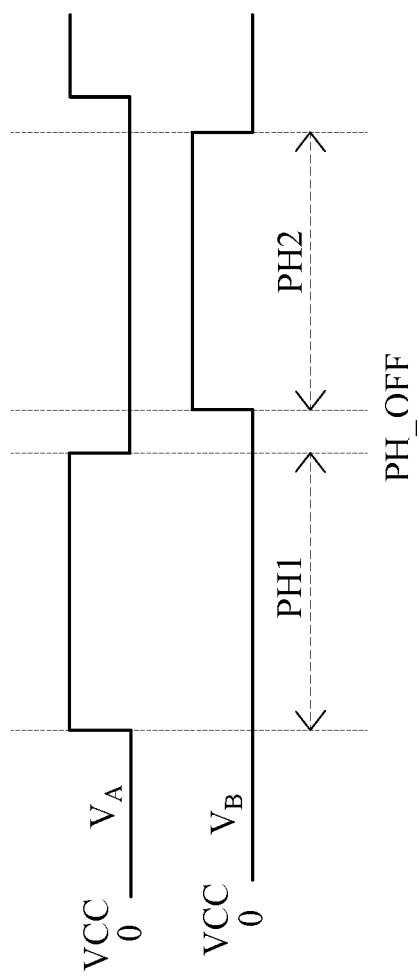
FIG. 5B shows a schematic view of the phase waveform diagram of the power stage of a single-phase brushless DC motor.

Referring to FIGS. 5A-5C, FIG. 5A shows a schematic view of circuit structure of the power stage of a single-phase brushless DC motor; FIG. 5B shows a schematic view of the phase waveform of the power stage of a single-phase brushless DC motor; FIG. 5C shows the truth table for the control signals AL, AL, BH, BL and the drive signals S1, S2, S3, S4 of the power stage of the single-phase brushless DC motor. The power stage of the single-phase brushless DC motor shown in FIG. 5A is in PH2, and the flow direction of the current I is from the VB point to the VA point as shown by the arrow; the waveforms of the potential at VA and VB points corresponding to PH1, PH2, and PH_OFF are shown in FIG. 5B; where, when VA=H, VB=L, the state is PH1; when VA=L, VB=H, the state is PH2; when VA=L, VB=L, the state is PH_OFF.

Since the control signal of the single-phase brushless DC motor only needs to achieve three states: PH1, PH2, and PH_OFF, the encoding modulation unit 4011 of the single-wire control device for brushless DC motor of the present invention must achieves the state of controlling the single-phase brushless DC motor to cycle between PH1, PH_OFF, PH2, and PH_OFF through encoding and modulation.

Figure 6:
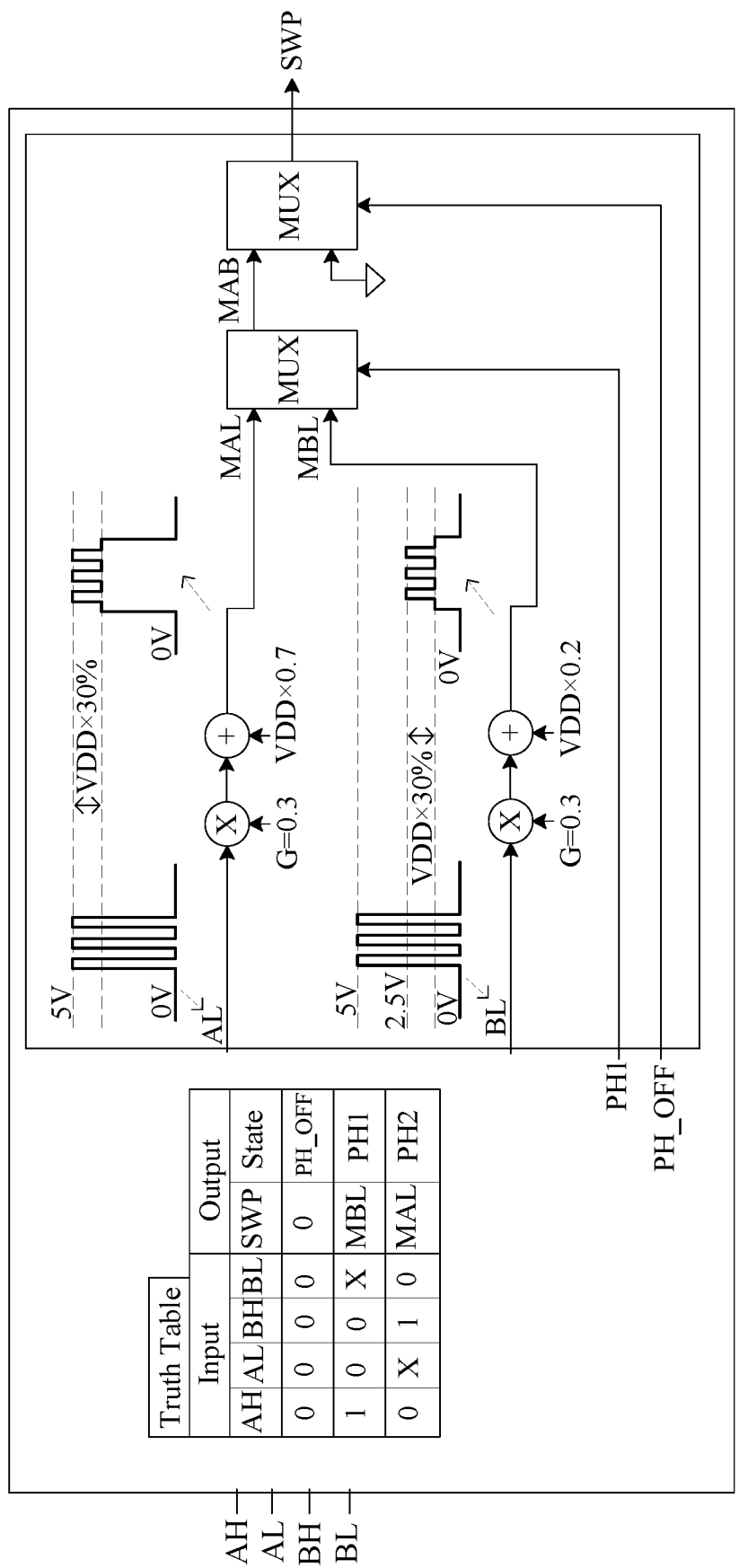
FIG. 6 is a schematic view of the encoding modulation unit of the single-wire control device for brushless DC motor according to the first embodiment of the present invention.

FIG. 6 is a schematic view of the first embodiment of the encoding modulation unit of the single-wire control device for brushless DC motor of the present invention. The truth value table on the left side in FIG. 6 shows the corresponding relationship between inputs (AH, AL, BH, BL) and outputs (SWP, status); in other words, when the control signals [AH, AL, BH, BL]=[0, 0, 0, 0], the single-phase brushless DC motor is in a PH_OFF state, and the modulated signal output by the encoding modulation unit is 0; when the control signals [AH, AL, BH, BL]=[1, 0, 0, BL], the single-phase brushless DC motor is in a PH1 state, and the modulated signal output by the coding modulation unit is MBL; when the control signals [AH, AL, BH, BL]=[0, X, 1, 0], the single-phase brushless DC motor is in a PH2 state, and the modulated signal output by the encoding modulation unit is MAL; wherein, X means that there is no difference between signal potential means that there is no difference between signal levels 0 and 1, PH1, PH2, and PH_OFF respectively represent the three states of the single-phase brushless DC motor; MAL and MBL are the modulated AL and BL signals respectively. 0 or 1, i.e., "don't care"; PH1, PH2, and PH_OFF respectively represent the three states of the single-phase brushless DC motor; MAL and MBL are the modulated AL and BL signals respectively.

The circuit diagram on the right side in FIG. 6 shows that in a preferred embodiment, the control signal AL can pass through a modulation function to modulate the AL signal into MAL=0.3×AL+0.7×VDD, where VDD is a voltage source. In other words, the amplitude of the AL signal is first reduced and then a voltage shift, i.e., a basic voltage, is added to complete the modulation function. Similarly, the modulation function for BL is MBL=0.3×BL+0.2×VDD. It is worth noting that although the AL and BL signals have been reduced in amplitude, the basic voltages of the voltage shifts of the two are 0.7 and 0.2 respectively; the design of these parameters can sufficiently distinguish and identify the reduced and modulated control signals MAL and MBL. Finally, after passing through the multiplexer MUX, the output signal can be output through a single transmission wire SWP.

Figure 7:
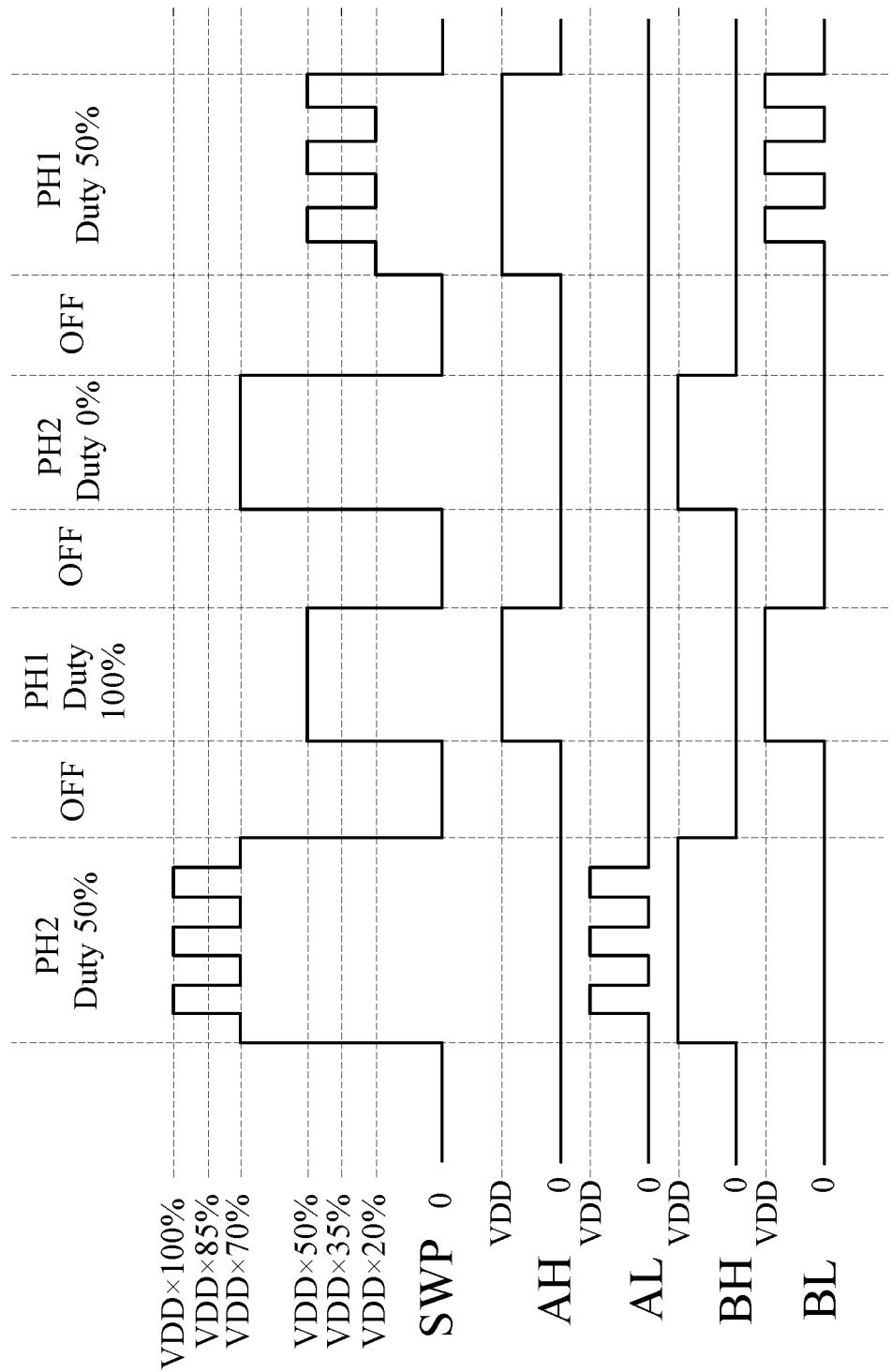
FIG. 7 is a schematic view of waveforms corresponding to the signals of FIG. 6.

FIG. 7 shows waveforms corresponding to the signals of FIG. 6. As shown in FIG. 7, the waveforms of the original control signals AH, AL, BH, and BL are reduced in amplitude and modulated to the SWP signal waveform; especially the AL and BL signals used in the output states PH1 and PH2 can be clearly distinguished through voltage shift.

Figure 8:
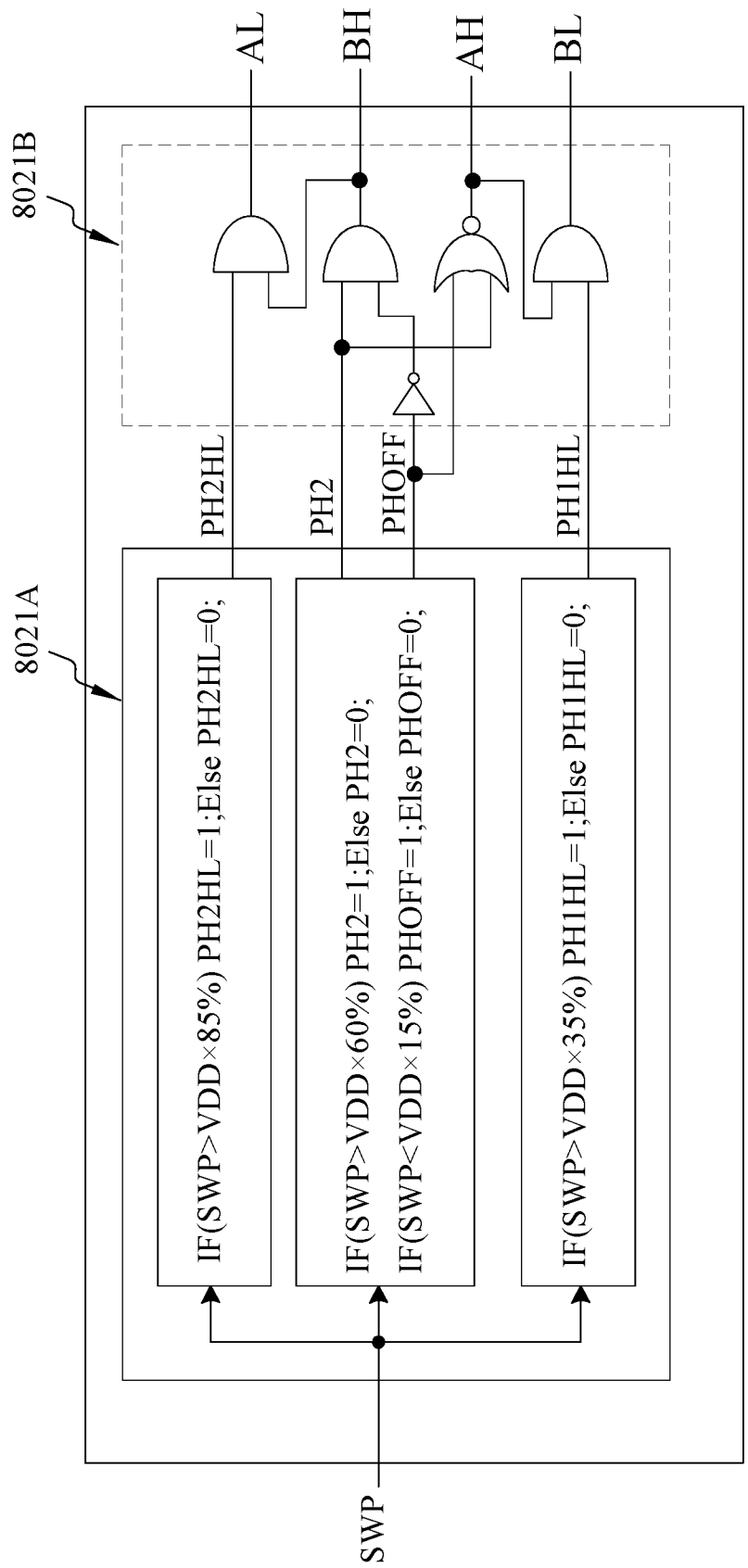
FIG. 8 is a schematic view of the demodulation decoding unit of the single-wire control device for brushless DC motor according to the first embodiment of the present invention.

FIG. 8 is a schematic view of the demodulation decoding unit of the single-wire control device for brushless DC motor of the first embodiment of the present invention, which corresponds to the encoding modulation unit of FIG. 6. Since the function of the demodulation decoding unit is to demodulate and decode the modulated signal from the SWP transmission wire into the original control signal, it can be regarded as the inverse function of the encoding modulation, or the reverse engineering design for the encoding modulation unit.

As shown in FIG. 8, the demodulation decoding unit further includes a comparison module 8021A and a combinational logic circuit 8021B; wherein, the comparison module 8021A processes the modulated signal through a comparison procedure to generate the PH1HL, PH2, PH2HL, PHOFF signals. The combinational logic circuit 8021B then maps the four signals, i.e., PH1HL, PH2, PH2HL and PHOFF, into four original control signals of AL, AH, BL and BH.

In a preferred embodiment, the operation of the comparison procedure is as follows:
when the modulated signal>VDD×85%, PH2HL=1; otherwise PH2HL=0;
when the modulated signal>VDD×60%, PH2=1; otherwise PH2=0;
when the modulated signal<VDD×15%, PHOFF=1; otherwise PHOFF=0; and
when the modulated signal>VDD×35%, PH1HL=1; otherwise PH1HL=0.

Similarly, the combinational logic circuit operates as follows:
AL=PH2HL$\wedge$BH;
BH=PH2$\wedge\neg$(PHOFF);
AH=$\neg$(PH2$\vee$PHOFF);
BL=AH$\wedge$PH1HL;
wherein, $\wedge$, $\vee$, and $\neg$ are logical operation symbols AND, OR, and NOT respectively.

In other words, after the modulated signal (SWP) is processed by the demodulation decoding unit, it can be restored to the original control signals AH, AL, BH, and BL, that is, it can restore the waveform as shown in FIG. 7.

It is worth noting that each numerical value used in the present embodiment is used to explain the implementation feasibility of the present invention, but the present invention is not limited thereto; the selection of other appropriate numerical values is also covered by the scope of the present invention.

Figure 9:
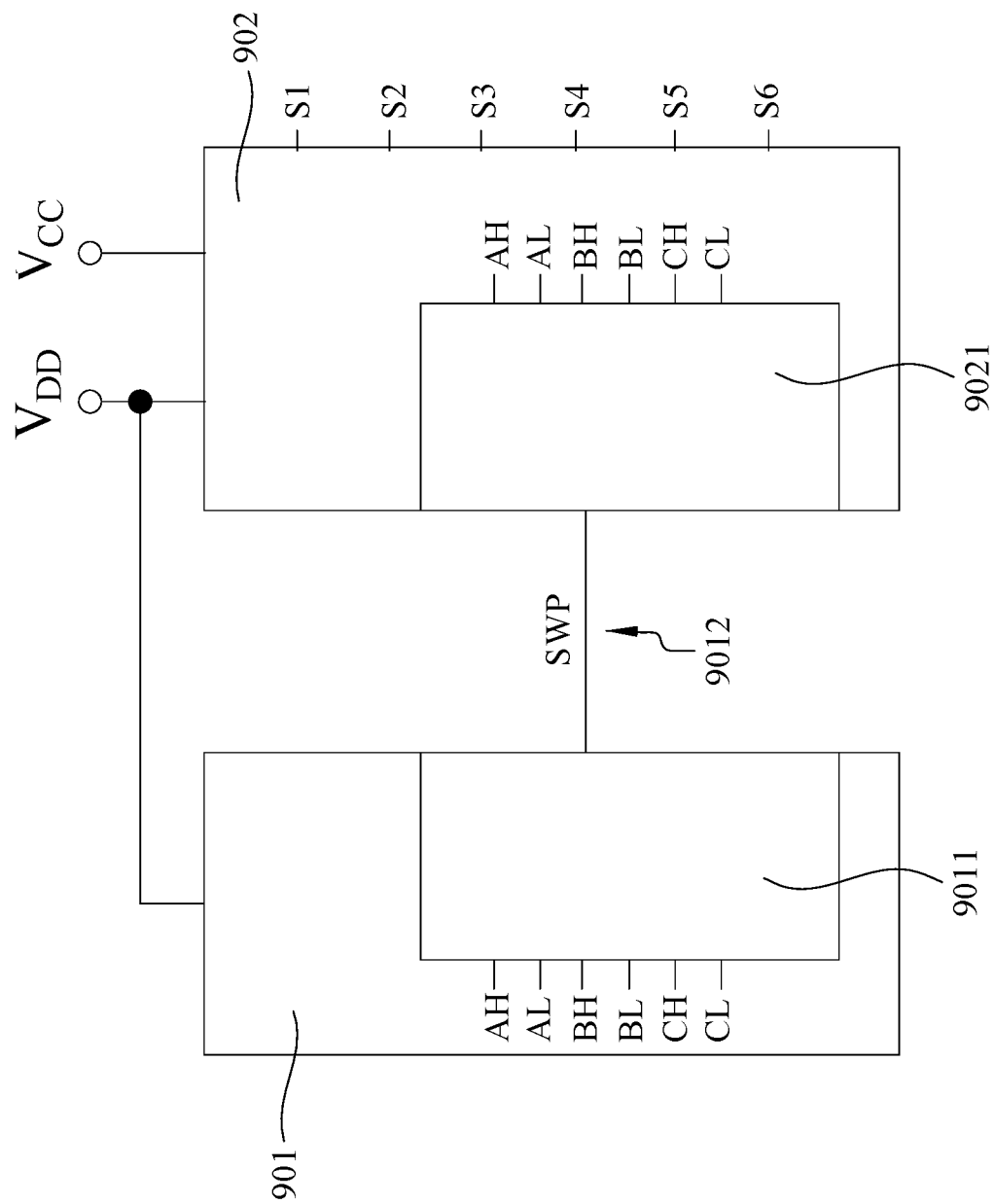
FIG. 9 a schematic structural view when the single-wire control device for brushless DC motor of the present invention is applied to a three-phase brushless DC motor.

FIG. 9 shows a schematic view of the structure when the single-wire control device for brushless DC motor of the present invention is applied to a three-phase brushless DC motor; as shown in FIG. 9, there are six control signals, namely AH, AL, BH, BL, CH, CL. Furthermore, the encoding modulation unit 9011 is integrated into the controller 901 of the three-phase brushless DC motor, and the demodulation decoding unit 9021 is also integrated into the pre-drive stage 902 of the brushless DC motor. Alternatively, the demodulation decoding unit 9021, the pre-driver stage 902, and the power stage 203 of FIG. 2 mentioned above are all integrated together, and the modulated control signal is transmitted through a transmission wire 9012.

Since the control signal of the three-phase brushless DC motor only needs to achieve six states such as PH1, PH2, PH3, PH4, PH5, and PH6, the encoding modulation unit 9011 of the single-wire control device for brushless DC motor of the present invention must be used to control the three-phase brushless DC motor to cycle through the six states, i.e., PH1, PH2, PH3, PH4, PH5, and PH6.

Figure 2:
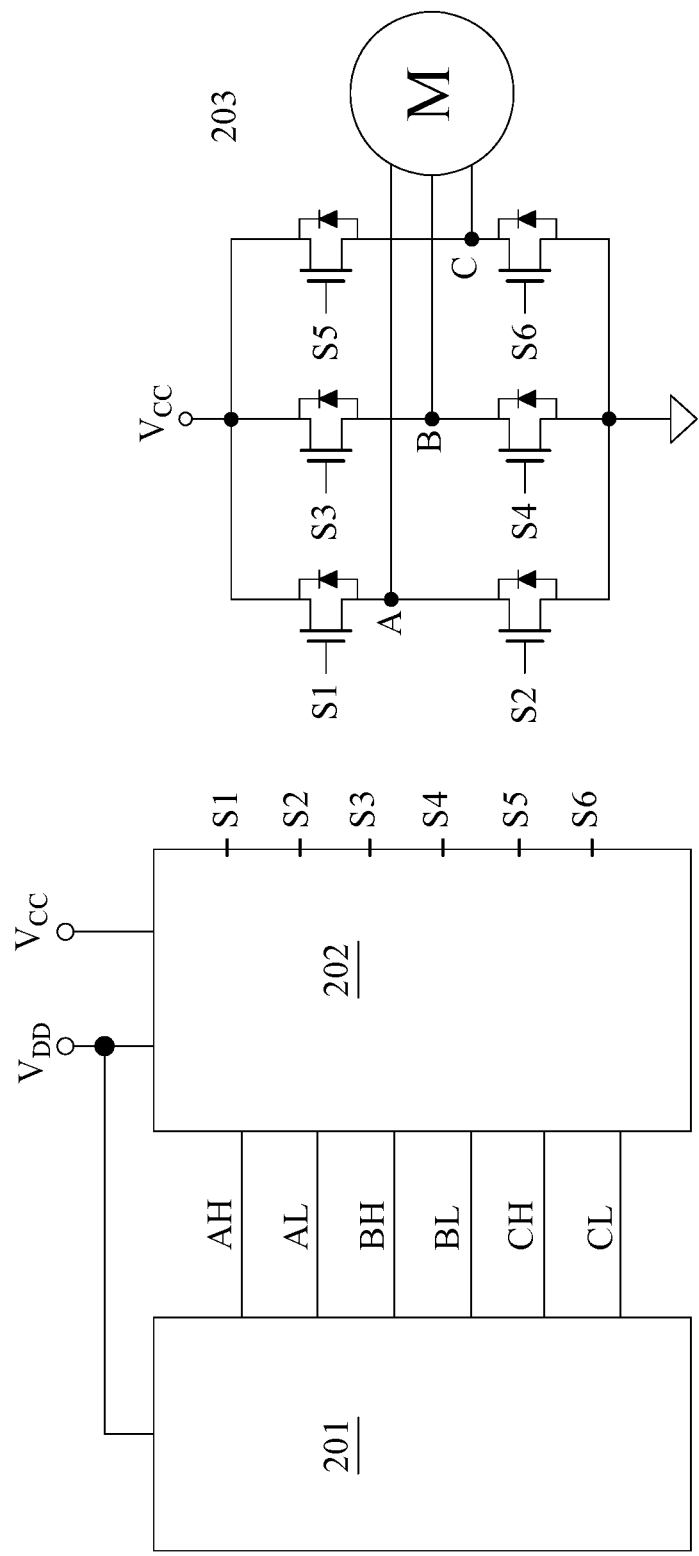
FIG. 2 shows a schematic view of control signals between a conventional three-phase BLDC controller and a pre-driver stage.
Figure 10A:
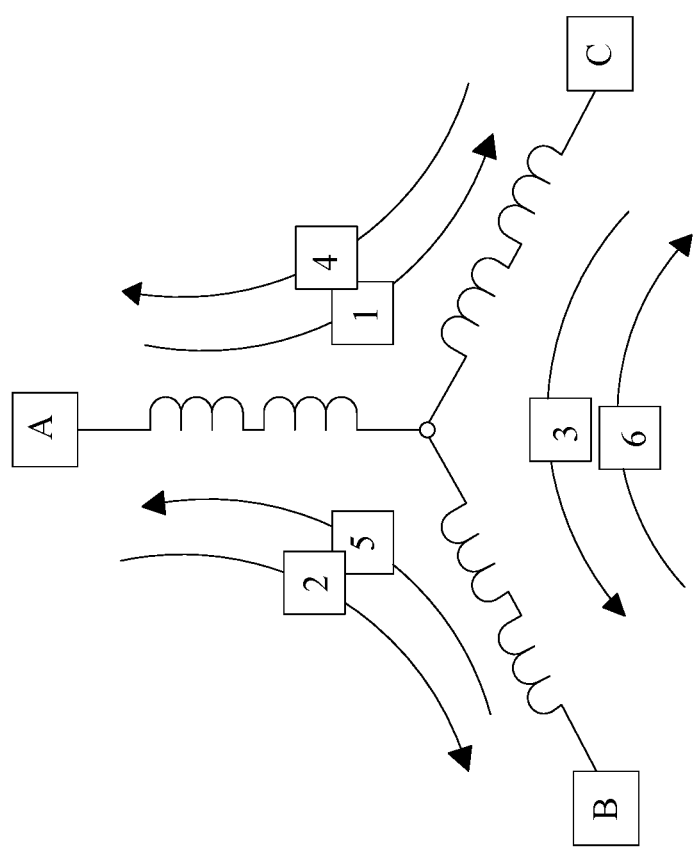
FIG. 10A shows a schematic view of the current flow structure in six states of the power stage of a three-phase brushless DC motor.
Figure 10B:
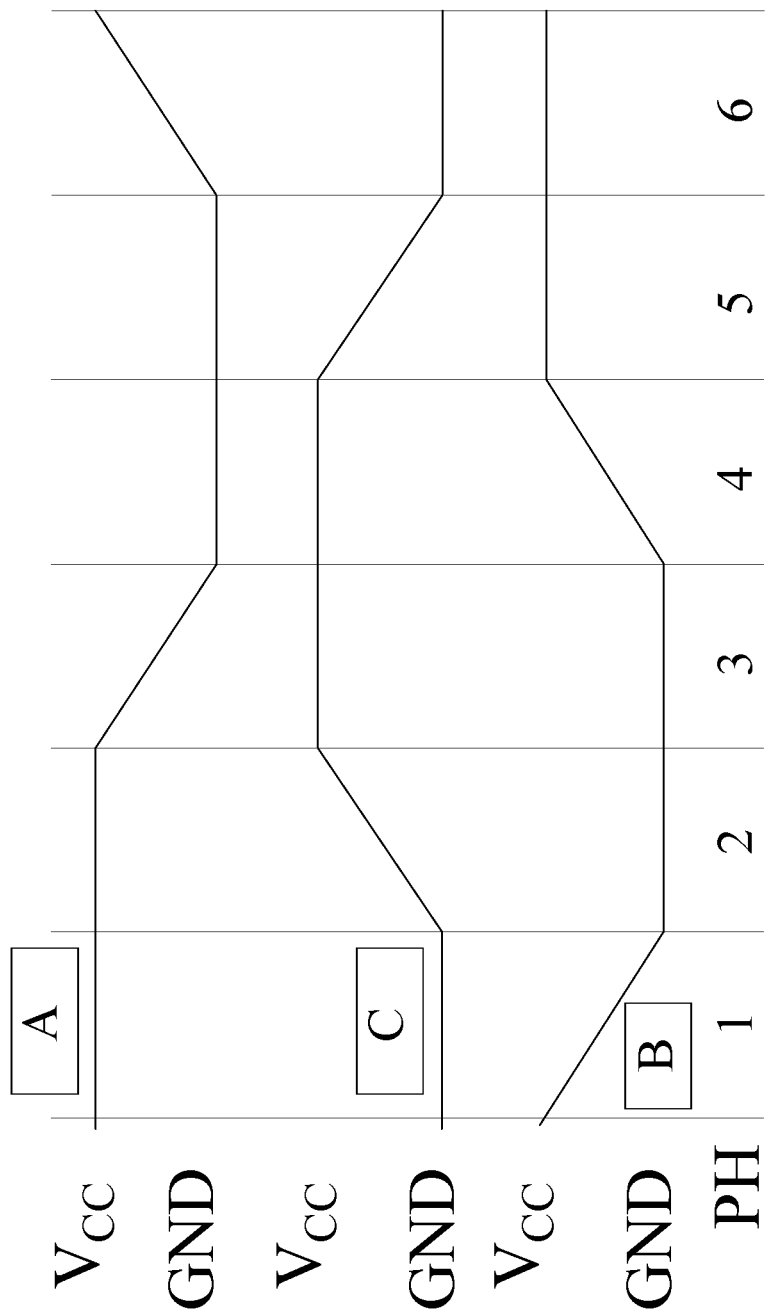
FIG. 10B shows a schematic view of phase waveforms of the power stage of a three-phase brushless DC motor.

Referring to FIGS. 10A-10C and also referring to the circuit of the power stage 203 in FIG. 2, FIG. 10A shows a schematic view of the current flow in six states of the power stage of the three-phase brushless DC motor; FIG. 10B shows the phase waveforms of the power stage of the three-phase brushless DC motor; FIG. 10C shows the truth table for the control signals AL, AL, BH, BL, CH, CL and the drive signals S1, S2, S3, S4, S5 and S6 for the power stage of the three-phase brushless DC motor. The flow direction of the current I of the power stage of the three-phase brushless DC motor shown in FIG. 10A is shown by arrows 1, 2, 3, 4, 5, and 6; which corresponds to the potential waveforms of the potentials of the A, B, and C points in FIG. 10B when in the state of PH1, PH2, PH3, PH4, PH5, and PH6, respectively.

Figure 11:
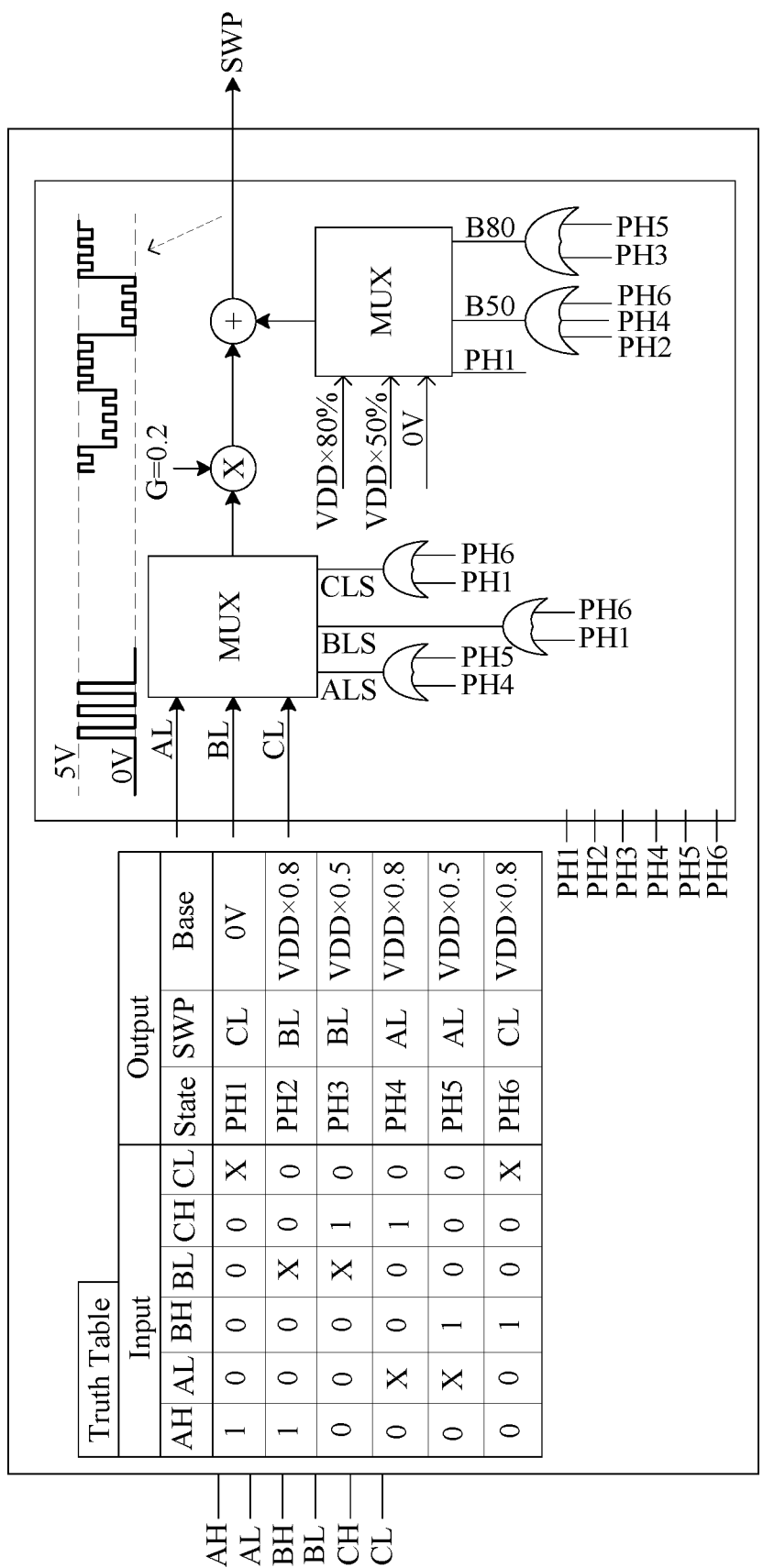
FIG. 11 is a schematic view of the encoding modulation unit of the single-wire control device for brushless DC motor according to the second embodiment of the present invention.

FIG. 11 is a schematic view of the encoding modulation unit of the single-wire control device for brushless DC motor of a second embodiment of the present invention. The truth table on the left side in FIG. 11, shows the corresponding relationship between inputs (AH, AL, BH, BL, CH, CL) and outputs (status, SWP, basic voltage), where the basic voltage is a voltage value added to the modulated signal before completing the modulation. In other words, according to the presentation of the truth table, when the control signal [AH, AL, BH, BL, CH, CL]=[1, 0, 0, 0, 0, X], the three-phase brushless DC The motor is in a PH1 state, the modulated signal output by the encoding modulation unit is MCL, and a basic voltage is 0V; when the control signals [AH, AL, BH, BL, CH, CL]=[1, 0, 0, X, 0, 0], the three-phase brushless DC motor is in a PH2 state, the modulated signal output by the encoding modulation unit is MBL, and the basic voltage is VDD×0.8; when the control signals [AH, AL, BH, BL, CH, CL]=[0, 0, 0, X, 1, 0], the three-phase brushless DC motor is in a PH3 state, and the modulated signal output by the encoding modulation unit is MBL, and the basic voltage is VDD×0.5; when the control signals [AH, AL, BH, BL, CH, CL]=[0, X, 0, 0, 1, 0], the three-phase brushless DC motor is in a PH4 state, the modulated signal output by the encoding modulation unit is MAL, and the basic voltage is VDD×0.8; when the control signals [AH, AL, BH, BL, CH, CL]=[0, X, 1, 0, 0, 0], the three-phase brushless DC motor is in a PH5 state, the modulated signal output by the encoding modulation unit is MAL, and the basic voltage is VDD×0.5; when the control signals [AH, AL, BH, BL, CH, CL]=[0, 0, 1, 0, 0, X], the three-phase brushless DC motor is in a PH6 state, the modulated signal output by the encoding modulation unit is MCL, and the basic voltage is VDD×0.8; wherein X means does not matter whether the potential of the signal is 1 or 0, PH1, PH2, PH3, PH4, PH5, and Ph6 are six different states for the three-phase brushless DC motor, and basic voltage is a voltage value added to the modulated signal before finishing modulation, wherein VDD is a voltage source.

The circuit diagram on the right side in FIG. 11 shows that in a preferred embodiment, the control signal AL can be modulated into MAL=0.2×AL+basic voltage through a modulation function. In other words, the amplitude of the AL signal is first reduced and then the voltage shift, i.e., the basic voltage, is added to complete the modulation function. Similarly, the modulation functions of BL and CL are respectively MBL=0.2×BL+the basic voltage and MCL=0.2×CL+the basic voltage. It is worth noting that although the AL, BL, and CL signals have all been reduced, the basic voltages of the voltage shifts of the three are 0.8VDD, 0.5VDD, and 0V respectively; the design of these parameters can sufficiently distinguish and identify the reduced and modulated control signals MAL, MBL, MCL. Therefore, the output signal is first determined by the multiplexer MUX, then reduced in amplitude and modulated to become a modulated control signal, and finally output through a single transmission wire SWP.

Figure 12:
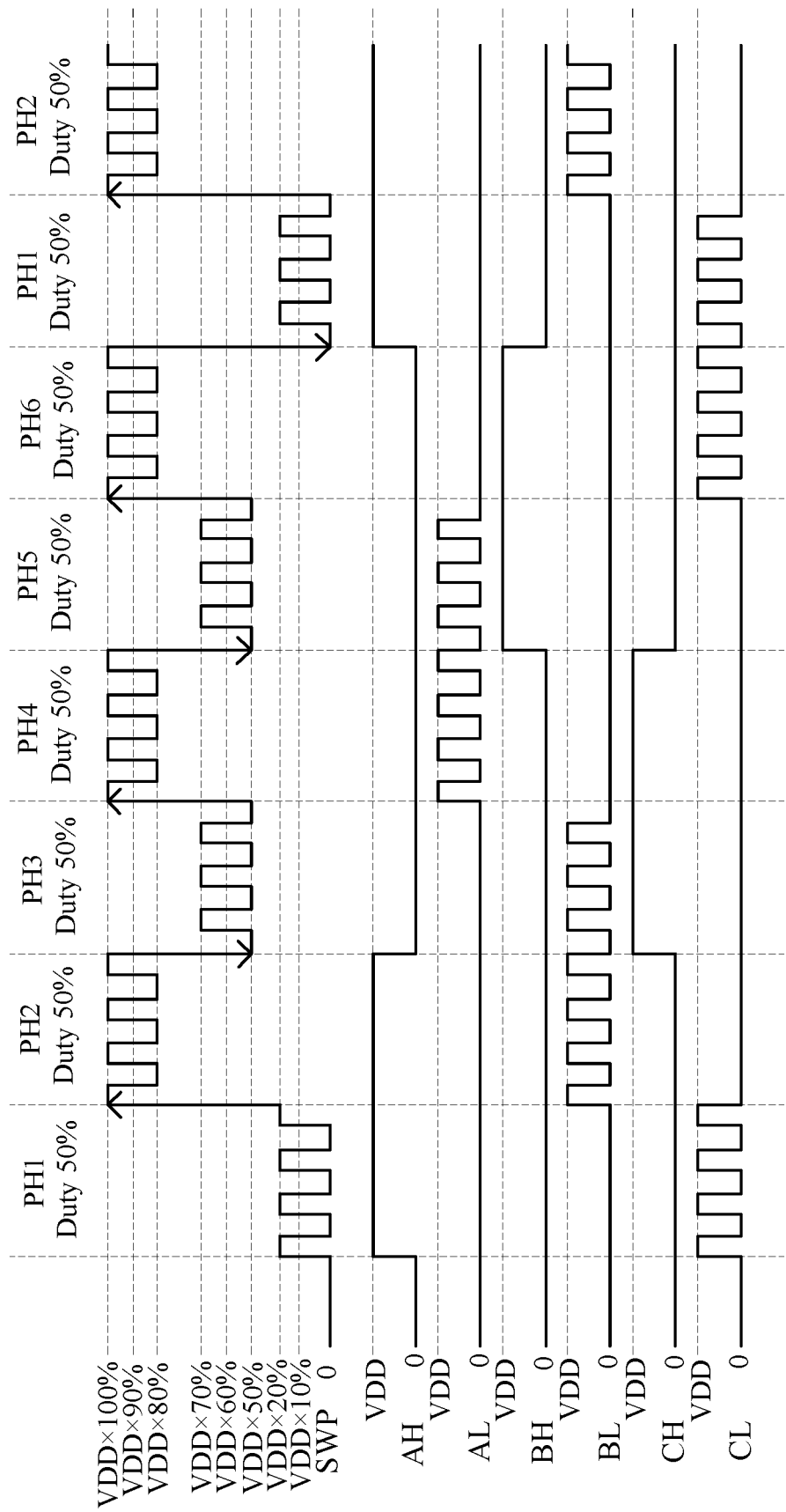
FIG. 12 shows a schematic view of waveforms corresponding to the signals of FIG. 11.

FIG. 12 shows waveforms corresponding to the signals of FIG. 11. As shown in FIG. 12, the waveforms of the original control signals AH, AL, BH, BL, CH, and CL are the SWP signal waveforms after amplitude reduction and modulation.

Figure 13:
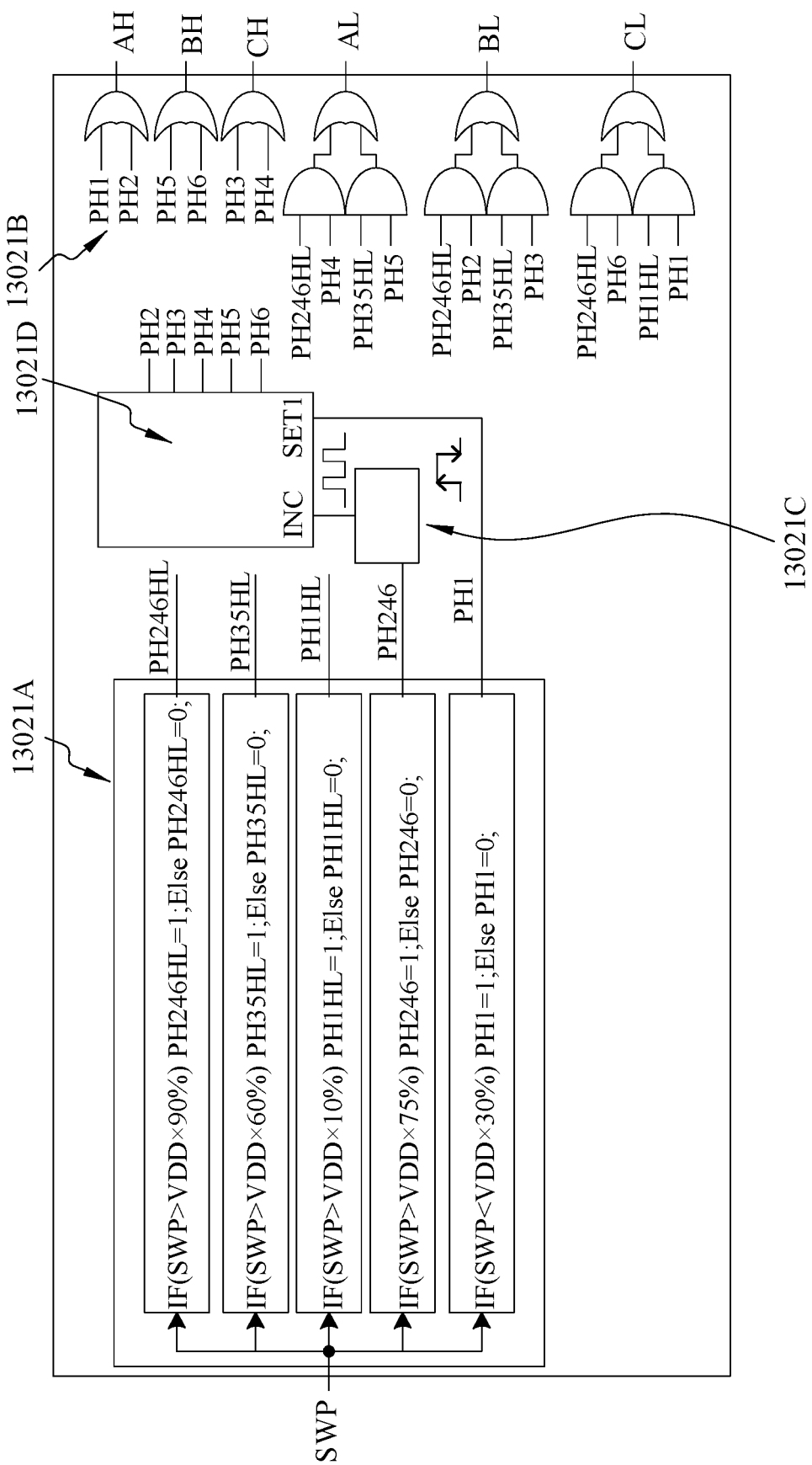
FIG. 13 is a schematic view of the demodulation decoding unit of the single-wire control device for brushless DC motor according to the second embodiment of the present invention.

FIG. 13 is a schematic view of the demodulation decoding unit of the single-wire control device for brushless DC motor of the second embodiment of the present invention, which corresponds to the encoding modulation unit of FIG. 11. As mentioned in the first embodiment, the function of the demodulation decoding unit is to demodulate and decode the modulated signal transmitted from the SWP transmission wire into the original control signal. Therefore, it can be regarded as the inverse function of the coding modulation, or the reverse engineering of the encoding modulation unit.

As shown in FIG. 13, the demodulation decoding unit further includes a comparison module 13021A and a combinational logic circuit 13021B. The comparison module 13021A processes the modulated signal through a comparison program to generate five signals, including PH1, PH1HL, PH246, PH246HL and PH35, then the PH246 signal passes through an edge detector 13021C and the PH1 signal passes through a state counter 13021D, and then outputs the five signals, namely, including PH2, PH3, PH4, PH5, PH6, and finally the combinational logic circuit maps ten signals including PH1, PH1HL, PH246, PH246HL, PH35, PH2, PH3, PH4, PH5, and PH6 into six original control signals including AL, AH, BL, BH, CH, and CL.

In a preferred embodiment, the operation of the comparison procedure is as follows:
when the modulated signal>VDD×95%, PH246HL=1; otherwise PH246HL=0;
when the modulated signal>VDD×60%, PH35HL=1; otherwise PH35HL=0;
when the modulated signal>VDD×10%, PH1HL=1; otherwise PH1HL=0;
when the modulated signal>VDD×75%, PH246=1; otherwise PH246=0; and
when the modulated signal<VDD×30%, PH1=1; otherwise PH1=0.

Similarly, the combinational logic circuit operates as follows:
AH=PH1∨PH2;
BH=PH5∨PH6;
CH=PH3∨PH4;
AL=(PH246HL∧PH4)∨(PH35HL∧PH5);
BL=(PH246HL∧PH2)∨(PH35HL∧PH3);
CL=(PH246HL∧PH6)∨(PH1HL∧PH1);
wherein, ∧ and ∨ are the logical operation symbols AND and OR, respectively.

In other words, after the modulated signal (SWP) is processed by the demodulation decoding unit, it can be restored to the original control signals AH, AL, BH, BL, CH, CL; that is, it can be restored as the waveform shown in FIG. 12.

It is worth noting that each numerical value used in this embodiment is used to explain the implementation feasibility of the present invention, but the present invention is not limited thereto; the selection of other appropriate numerical values is also within the scope of the present invention, within the range In summary, the single-wire control device for brushless DC motor of the present invention can effectively reduce the original need for 4-6 transmission wires to transmit control signals between the controller and the pre-drive stage. Through the modulation design, the present invention effectively modulates the signals so that the signals can be transmitted by a single transmission wire; furthermore, the single-wire control device for brushless DC motor can be further integrated into the controller and pre-driver stage to reduce the occupied circuit board area.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A single-wire control device for a brushless direct current (DC) motor, suitable for use between a controller and a pre-drive stage of the brushless DC motor, comprising:
an encoding modulation unit, a transmission wire, and a demodulation decoding unit;
wherein the encoding modulation unit is connected to the controller for receiving control signals from the controller and performing encoding and modulation on the control signals to generate a modulated signal; the transmission wire is connected to the encoding modulation unit to transmit the modulated signal to the demodulation decoding unit; the demodulation decoding unit is connected to the transmission wire, and is used to demodulate and decode the received modulated signal to generate the control signals, and then transmit the control signals to the pre-driver stage;
wherein the brushless DC motor is a single-phase brushless DC motor, and there are four control signals, designated as AH, AL, BH, and BL, respectively;
wherein:
when the control signals [AH, AL, BH, BL]=[0, 0, 0, 0], the single-phase brushless DC motor is in a PH_OFF state, and the modulated signal output by the encoding modulation unit is 0;
when the control signals [AH, AL, BH, BL]=[1, 0, 0, X], the single-phase brushless DC motor is in a PH1 state, the modulated signal output by the encoding modulation unit is MBL; and
when the control signals [AH, AL, BH, BL]=[0, X, 1, 0], the single-phase brushless DC motor is in a PH2 state, the modulated signal output by the encoding modulation unit is MAL;
wherein X represents a value of 1 or 0, and MAL and MBL are modulated AL and BL signals respectively.

2. The single-wire control device for a brushless DC motor according to claim 1, wherein the encoding modulation unit is integrated in the controller of the brushless DC motor, the demodulation decoding unit is integrated in the pre-drive stage of the brushless DC motor, or the demodulation decoding unit, the pre-driver stage and a power stage are integrated together.

3. The single-wire control device for a brushless DC motor according to claim 1, wherein a modulation function for the AL is MAL=0.3×AL+0.7×VDD, and a modulation function for the BL is MBL=0.3×BL+0.2×VDD, wherein VDD is a voltage source.

4. The single-wire control device for a brushless DC motor according to claim 3, wherein the demodulation decoding unit further includes a comparison module and a combinational logic circuit; the comparison module processes the modulated signal through a comparison procedure to generate PH1HL, PH2, PH2HL, and PHOFF signals and the combinational logic circuit then maps the four signals PH1HL, PH2, PH2HL, and PHOFF into the four original control signals AL, AH, BL, and BH.

5. The single-wire control device for a brushless DC motor according to claim 4, wherein the operation of the comparison procedure is as follows:

when the modulated signal>VDD×85%, PH2HL=1; otherwise PH2HL=0;
when the modulated signal>VDD×60%, PH2=1; otherwise PH2=0;
when the modulated signal<VDD×15%, PHOFF=1; otherwise PHOFF=0; and
when the modulated signal>VDD×35%, PH1HL=1; otherwise PH1HL=0.

6. The single-wire control device for a brushless DC motor according to claim 5, wherein the combinational logic circuit operates as follows:
AL=PH2HL∧BH;
BH=PH2∧¬(PHOFF);
AH=¬(PH2∨PHOFF);
BL=AH∧PH1HL;
wherein, ∧, ∨, and ¬ are logical operation symbols AND, OR, and NOT respectively.

7. A single-wire control device for a brushless direct current (DC) motor, suitable for use between a controller and a pre-drive stage of the brushless DC motor, comprising:
an encoding modulation unit, a transmission wire, and a demodulation decoding unit;
wherein the encoding modulation unit is connected to the controller for receiving control signals from the controller and performing encoding and modulation on the control signals to generate a modulated signal; the transmission wire is connected to the encoding modulation unit to transmit the modulated signal to the demodulation decoding unit; the demodulation decoding unit is connected to the transmission wire, and is used to demodulate and decode the received modulated signal to generate the control signals, and then transmit the control signals to the pre-driver stage;
wherein the brushless DC motor is a three-phase brushless DC motor, and there are six control signals, designated as AH, AL, BH, BL, CH, and CL;
wherein:
when the control signals [AH, AL, BH, BL, CH, CL]=[1, 0, 0, 0, 0, X], the three-phase brushless DC The motor is in a PH1 state, the modulated signal output by the encoding modulation unit is MCL, and a basic voltage is 0V;
when the control signals [AH, AL, BH, BL, CH, CL]=[1, 0, 0, X, 0, 0], the three-phase brushless DC motor is in a PH2 state, the modulated signal output by the encoding modulation unit is MBL, and the basic voltage is VDD×0.8;
when the control signals [AH, AL, BH, BL, CH, CL]=[0, 0, 0, X, 1, 0], the three-phase brushless DC motor is in a PH3 state, and the modulated signal output by the encoding modulation unit is MBL, and the basic voltage is VDD×0.5;
when the control signals [AH, AL, BH, BL, CH, CL]=[0, X, 0, 0, 1, 0], the three-phase brushless DC motor is in a PH4 state, the modulated signal output by the encoding modulation unit is MAL, and the basic voltage is VDD×0.8;
when the control signals [AH, AL, BH, BL, CH, CL]=[0, X, 1, 0, 0, 0], the three-phase brushless DC motor is in a PH5 state, the modulated signal output by the encoding modulation unit is MAL, and the basic voltage is VDD×0.5;
when the control signals [AH, AL, BH, BL, CH, CL]=[0, 0, 1, 0, 0, X], the three-phase brushless DC motor is in a PH6 state, the modulated signal output by the encoding modulation unit is MCL, and the basic voltage is VDD×0.8;
wherein X represents a value of 1 or 0, PH1, PH2, PH3, PH4, PH5, and Ph6 are six different states for the three-phase brushless DC motor, and the basic voltage is a voltage value added to the modulated signal before finishing modulation, wherein VDD is a voltage source.

8. The single-wire control device for a brushless DC motor according to claim 7, wherein modulation functions for AL, BL, and CL are respectively MAL=0.2×AL+basic voltage, MBL=0.2×BL+basic voltage, and MCL=0.2×CL+basic voltage.

9. The single-wire control device for a brushless DC motor according to claim 8, wherein the demodulation decoding unit further includes a comparison module and a combinational logic circuit; the comparison module processes the modulated signal through a comparison procedure to generate five signals, including PH1, PH1HL, PH246, PH246HL, PH35, and then the PH246 signal goes through an edge detector and the PH1 signal goes through a state counter to output five signals, including PH2, PH3, PH4, PH5, PH6 signals; and the combinational logic circuit maps ten signals, including PH1, PH1HL, PH246, PH246HL, PH35, PH2, PH3, PH4, PH5, and PH6 into the six original-control signals, including AL, AH, BL, BH, CH, and CL.

10. The single-wire control device for a brushless DC motor according to claim 9, wherein the operation of the comparison procedure is as follows:
when the modulated signal>VDD×95%, PH246HL=1; otherwise PH246HL=0;
when the modulated signal>VDD×60%, PH35HL=1; otherwise PH35HL=0;
when the modulated signal>VDD×10%, PH1HL=1; otherwise PH1HL=0;
when the modulated signal>VDD×75%, PH246=1; otherwise PH246=0; and
when the modulated signal<VDD×30%, PH1=1; otherwise PH1=0.

11. The single-wire control device for a brushless DC motor according to claim 10, wherein the combinational logic circuit operates as follows:
AH=PH1∨PH2;
BH=PH5∨PH6;
CH=PH3∨PH4;
AL=(PH246HL∧PH4)∨(PH35HL∧PH5);
BL=(PH246HL∧PH2)∨(PH35HL∧PH3);
CL=(PH246HL∧PH6)∨(PH1HL∧PH1);
wherein, ∧ and ∨ are logical operation symbols AND and OR, respectively.

12. The single-wire control device for a brushless DC motor according to claim 7, wherein the encoding modulation unit is integrated in the controller of the brushless DC motor; the demodulation decoding unit is integrated in the pre-drive stage of the brushless DC motor; or the demodulation decoding unit, the pre-driver stage and a power stage are integrated together.

* * * * *